Figure 1:
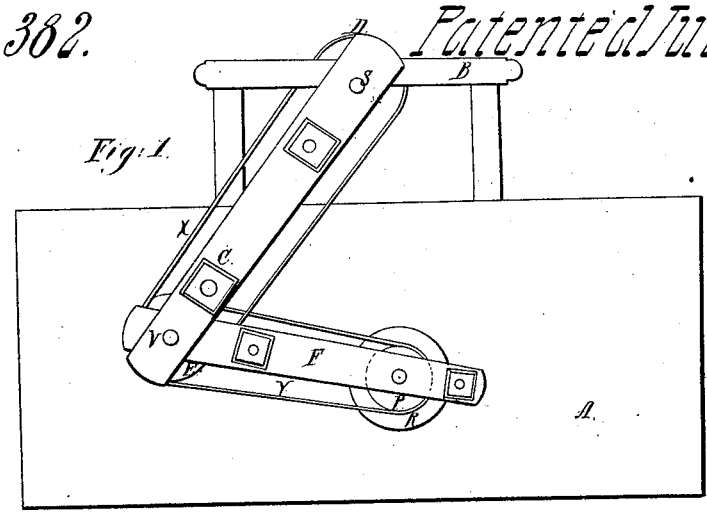

J. Moore,
Polishing Wood.
N° 15,382. Patented July 22, 1856.

UNITED STATES PATENT OFFICE.

JNO. MOORE, OF GARDINER, MAINE.

POLISHING-MACHINE.

Specification of Letters Patent No. 15,382, dated July 22, 1856.

*To all whom it may concern:*

Be it known that I, JOHN MOORE, of Gardiner, in the county of Kennebec and State of Maine, have invented a new and useful Machine for the Purpose of Polishing Doors, Tables, and other Purposes; and I hereby declare the following to be a full and true description thereof, reference being had to the drawings herewith presented, which drawings constitute a part of said description, as follows.

The principle of my invention consists in preparing a revolving disk of wood or metal or other substance in such manner as to revolve by power and so arranged in a frame that is movable on its joints as to be easily brought by the hand of the operator to act on any part of the bench or table on which the work is placed to be polished, the disk or rubber is to be moved while in operation without any interruption of its rotation. This machine is equally applicable to the polishing of doors tables or other cabinet work that can be laid upon the bench and also to scouring of leather, by which a great amount of hand labor is saved.

To enable others to make and use my invention I proceed to describe the construction and manner of using the same, to wit, see the drawing.

Figure 2:
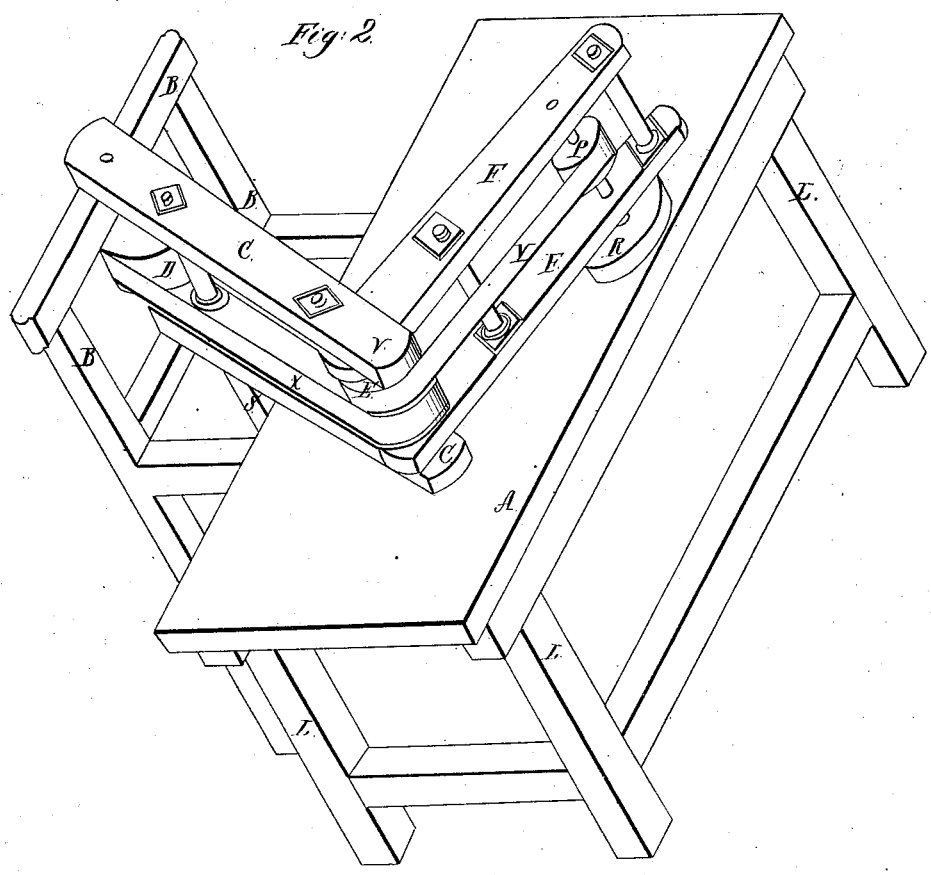

Figure 1 is a plan or top view of the machine. Fig. 2 is an isometrical view of the same.

Similar letters refer to the same parts in both figures.

A is the table or bench supported on its posts (L L.)

B is a back frame connected to the table and supporting a shaft S, this shaft S carries a driving pulley D, which pulley D has a belt X, which turns a drum E this drum E is supported in the frame C C, which is movable being jointed to the frame B B and swings like a crane having its fulcrum at the shaft S. F, F, is a similar frame jointed to the frame C C and has its fulcrum at V, concentric with the shaft of the drum E which drum E, gives motion by the belt Y, to the pulley P, on the shaft of the rubber R, this rubber R is faced with emery or sand paper or any other material suitable for the kind of work required—and for scouring leather it is replaced by a brush wheel, stone or any kind of a burnisher, being easily unscrewed from the shaft and removed or changed instantly.

By inspecting Fig. 1, it will be seen that the pulley D, is always kept at a uniform distance from the drum E, and therefore the belt X, will always be kept in equal tension and also the drum E, being kept equidistant from the pulley P, will keep the belt Y, equally tight in whatever position the rubber may be moved over the whole surface of the table.

The table should be so arranged as to be readily raised or lowered in a perfectly horizontal position when required, this may be done by means of the screw, wedge or cam, or any of those devices well known to mechanics.

In using this machine the power is communicated first to the shaft S which by the belts and pulleys above described puts the rubber in motion by water, steam or any other available power, then by applying the hand to the frame F F, near the rubber I bring the rubber to all parts of the work dwelling longest on such parts as require the most working, and changing the rubbers fine or coarse when required.

What I claim as my invention and desire to secure by Letters Patent is—

The general construction of the machine substantially as above described, having a rubber R, revolving by power and so constructed as to be readily applied while in motion to all parts of the work as required.

In testimony whereof I hereto subscribe my name in presence of two witnesses.

JOHN MOORE.

Witnesses:
    DANIEL NUTTING,
    J. GARDNER.